US008996305B2

(12) United States Patent
Kesar et al.

(10) Patent No.: US 8,996,305 B2
(45) Date of Patent: Mar. 31, 2015

(54) SYSTEM AND METHOD FOR DISCOVERING PHOTOGRAPH HOTSPOTS

(75) Inventors: Parag Kesar, Sunnyvale, CA (US); Mausam Hazarika, Milpitas, CA (US)

(73) Assignee: Yahoo! Inc., Sunnyvale, CA (US)

( * ) Notice: Subject to any disclaimer, the term of this patent is extended or adjusted under 35 U.S.C. 154(b) by 172 days.

(21) Appl. No.: 13/490,524

(22) Filed: Jun. 7, 2012

(65) Prior Publication Data

US 2013/0332068 A1 Dec. 12, 2013

(51) Int. Cl.
  *G01C 21/00* (2006.01)
  *G01C 21/36* (2006.01)

(52) U.S. Cl.
  CPC ........ *G01C 21/3682* (2013.01); *G01C 21/3679* (2013.01)
  USPC .......................................... 701/438

(58) Field of Classification Search
  CPC ................... G06F 17/30241; G06F 17/30265; G06F 17/30268; G06F 17/30873; G01C 21/3679; G01C 21/3682
  USPC .......................................... 701/426, 430, 438
  See application file for complete search history.

(56) References Cited

U.S. PATENT DOCUMENTS

| | | | |
|---|---|---|---|
| 7,492,372 B2 * | 2/2009 | Abshear et al. ............... | 345/581 |
| 7,596,581 B2 * | 9/2009 | Frank et al. ............................ | 1/1 |
| 7,634,472 B2 * | 12/2009 | Thrall ................................... | 1/1 |
| 7,856,370 B2 * | 12/2010 | Katta et al. .................... | 705/7.34 |
| 8,098,899 B2 * | 1/2012 | Ohashi ........................... | 382/113 |
| 8,285,483 B2 * | 10/2012 | Amer-Yahia et al. ......... | 701/428 |
| 8,396,287 B2 * | 3/2013 | Adam et al. ................... | 382/160 |
| 8,407,225 B2 * | 3/2013 | Lahcanski et al. ............ | 707/738 |
| 8,532,927 B2 * | 9/2013 | Joshi et al. ..................... | 701/537 |
| 8,581,997 B2 * | 11/2013 | Lahcanski et al. .......... | 348/222.1 |

(Continued)

FOREIGN PATENT DOCUMENTS

| | | | | |
|---|---|---|---|---|
| JP | 2003330767 A | * | 11/2003 | .............. G06F 12/00 |
| JP | 2004310373 A | * | 11/2004 | .............. G06F 17/30 |

(Continued)

OTHER PUBLICATIONS

Chen, Wei-Chao et al., "Visual summaries of popular landmarks from community photo collections", 2009 Conference Record of the Forty-Third IEEE Asilomar Conference on Signals, Systems and Computers, Nov. 1-4, 2009, Pacific Grove, CA, pp. 1248-1255.*
Crandall, David et al., "Mapping the worlds photos", WWW 2009, Apr. 20-24, 2009, IW3C2, Madrid, Spain, downloaded from http://www.cs.cornell.edu/~crandall/papers/mapping09www.pdf.*
Ifo Apple Store (web page), "Fifth Avenue Cube is Hot Photo Target", May 30, 2011, downloaded from http://www.ifoapplestore.com/2011/05/30/fifth-avenue-cube-is-hot-photo-target/.*

(Continued)

*Primary Examiner* — Behrang Badii
*Assistant Examiner* — David Testardi
(74) *Attorney, Agent, or Firm* — James J. DeCarlo; Greenberg Traurig, LLP

(57) ABSTRACT

A method and system for discovering locations of interesting photographs. The method includes receiving a geographic location and retrieving at least one portion of a map associated with the geographic location. The at least one portion of the map associated with the geographic location is displayed. A plurality of photographs tagged with the geographic location are asynchronously retrieved. The retrieved photographs are ranked based on interestingness of the retrieved photographs. The method further comprises dynamically propagating the at least one portion of the map with markers identifying locations of highest ranking photographs within the geographic location and indicating one or more photographic hotspots based on the propagated markers.

16 Claims, 11 Drawing Sheets

(56) References Cited

U.S. PATENT DOCUMENTS

| | | | |
|---|---|---|---|
| 8,595,638 B2 * | 11/2013 | Belitz et al. | 715/766 |
| 8,627,391 B2 * | 1/2014 | Lahcanski et al. | 725/105 |
| 8,669,994 B2 * | 3/2014 | Cardno et al. | 345/581 |
| 2006/0242139 A1 * | 10/2006 | Butterfield et al. | 707/5 |
| 2009/0279794 A1 * | 11/2009 | Brucher et al. | 382/225 |
| 2011/0219422 A1 * | 9/2011 | Shen et al. | 726/1 |
| 2013/0073988 A1 * | 3/2013 | Groten et al. | 715/753 |

FOREIGN PATENT DOCUMENTS

| | | | |
|---|---|---|---|
| JP | 2008288881 A | * | 11/2008 |
| JP | 2008288882 A | * | 11/2008 |

OTHER PUBLICATIONS

JPO machine translation of JP 2008-288881 (original JP document published Nov. 27, 2008).*

Tuaw (web page), "Heatmap shows Fifth Avenue Apple Store is hot place", May 31, 2011, downloaded from http://www.tuaw.com/2011/05/31/heatmap-shows-fifth-avenue-apple-store-is-hot-place-for-photos/.*

Zheng, Yan-Tao et al., "Tour the world: building a web-scale landmark recognition engine", IEEE Conference on Computer Vision and Pattern Recognition (CVPR 2009), Jun. 20-25, 2009, pp. 1085-1092.*

* cited by examiner

SYSTEM AND METHOD FOR DISCOVERING PHOTOGRAPH HOTSPOTS

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The invention described herein generally relates to discovering the location of photographs on a map, particularly of user-tagged photographs that exhibit varying degrees of interestingness, as well as discovering interesting locations from which to take photographs.

BACKGROUND OF THE INVENTION

There are a number of location-based online services available on the Internet or World-Wide Web. For example, the Yahoo! Maps service provides maps and driving directions, as well as online photos, which are typically aerial photos supplied by Yahoo! Another example includes the Google Maps service, which provides similar functions. Most of these services require the user to select a particular location or locations, allowing the user to download map, satellite images, or other information about the location. For instance, the user may enter text into an interface for a particular city or street address and obtain back information as to, for instance, local restaurants, hotels, etc. on one's computer or computing device.

In addition to providing map and direction information, some of these location-based services also provide images or photographs associated with a location or business, such as a "Street View." When a user enters a location into these location-based services, random photographs submitted by different users and/or "street-level" photographs may be retrieved. These photographs have little interest value, however, and may not be particularly useful for photographers and tourists interested in finding areas with the best scenic views. "Street-level" photographs are usually taken by cameras attached on moving vehicles driving on a road capturing multiple sequential photographs of the surrounding road and streets. As a result, these photographs are more logistical and not necessarily useful in elegantly depicting areas of interest for a user who would like to find picturesque locations.

There are currently no systems that allow users to find areas of interest based on interesting photographs. As a tourist or a photographer, one intends on finding and taking memorable pictures from one's travels. One often spends a substantial amount of time and energy doing research to find good photographic locations when planning a trip. Location is a critical aspect of photography and although there are known services that provide photos associated with various locations on a map, the quality of the photos returned as part of a location-based search is not necessarily controlled by filters, such as tangible-popularity-gauging filters. Therefore, there is a need for a system that provides locations on map of the most interesting photographs.

SUMMARY OF THE INVENTION

The present invention provides methods, systems, and computer program products for discovering locations of interesting photographs. The method according to one embodiment comprises receiving a geographic location and retrieving at least one portion of a map associated with the geographic location. The at least one portion of the map associated with the geographic location is displayed. A plurality of photographs tagged with the geographic location are retrieved, which may be performed asynchronously. The retrieved photographs are ranked based on interestingness of the retrieved photographs. The method further comprises dynamically propagating the at least one portion of the map with markers identifying locations of highest ranking photographs within the geographic location and indicating one or more photographic hotspots based on the propagated markers. A hotspot may include a cluster of photographs, or a set of closely grouped or overlapping photographs in a given location. These hotspots may indicate popular geographic locations that may be of interest to vacationers and photographers. The markers identifying locations of photographs may be displayed on a map and overlap each other. Each marker may be displayed as translucent shapes on a map and appear darker because of overlapping with a plurality of other markers.

According to one embodiment, asynchronously retrieving one or more photographs tagged with geographic location information includes retrieving the photographs from one or more online photograph collections. In another embodiment, asynchronously retrieving the photographs tagged with the geographic location information includes retrieving the photographs from one or more social networking websites. A zoom action on the displayed at least one portion of the map may be determined. The geographic location may be updated based on the zoom action and photographs tagged with the updated geographic location information may be retrieved. In one embodiment, the markers on the at least one portion of the map may be displayed in colors based on the interestingness of the retrieved photographs.

In some embodiments, the method comprises determining a user's location and providing navigation directions to a location associated with a given photograph. A distance between the user's location and the location of the given photograph is determined. A determination may be made whether the location of the given photograph is at least one of walkable and drivable distances.

In accordance with some aspects, the method comprises generating a heat map based on the interestingness of the retrieved photographs. Coordinates identifying a geographical area are received, as well as map data associated with the geographical area. One or more tagged photographs associated with the geographical area are retrieved. Weights are assigned to photographs based on interestingness of the photographs. The method further comprises generating a heat map of the geographical area based on the weights of the photographs and indicating one or more photographic hotspots on the heat map.

The method may further include determining relevance of the tags to the geographical area. A set of relevant photographs from the plurality of photographs are identified. The set of relevant photographs may be assigned extra weight. The one or more photographic hotspots indicated on the heat map may be based on tagged photographs within the boundaries of the geographical area and zoom level. A given zone may indicate an overall popularity of the plurality photographs clustered in the given zone.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE INVENTION

In the following description of the embodiments of the invention, reference is made to the accompanying drawings that form a part hereof, and in which is shown by way of illustration, exemplary embodiments in which the invention may be practiced. It is to be understood that other embodiments may be utilized and structural changes may be made without departing from the scope of the present invention.

Figure 1:
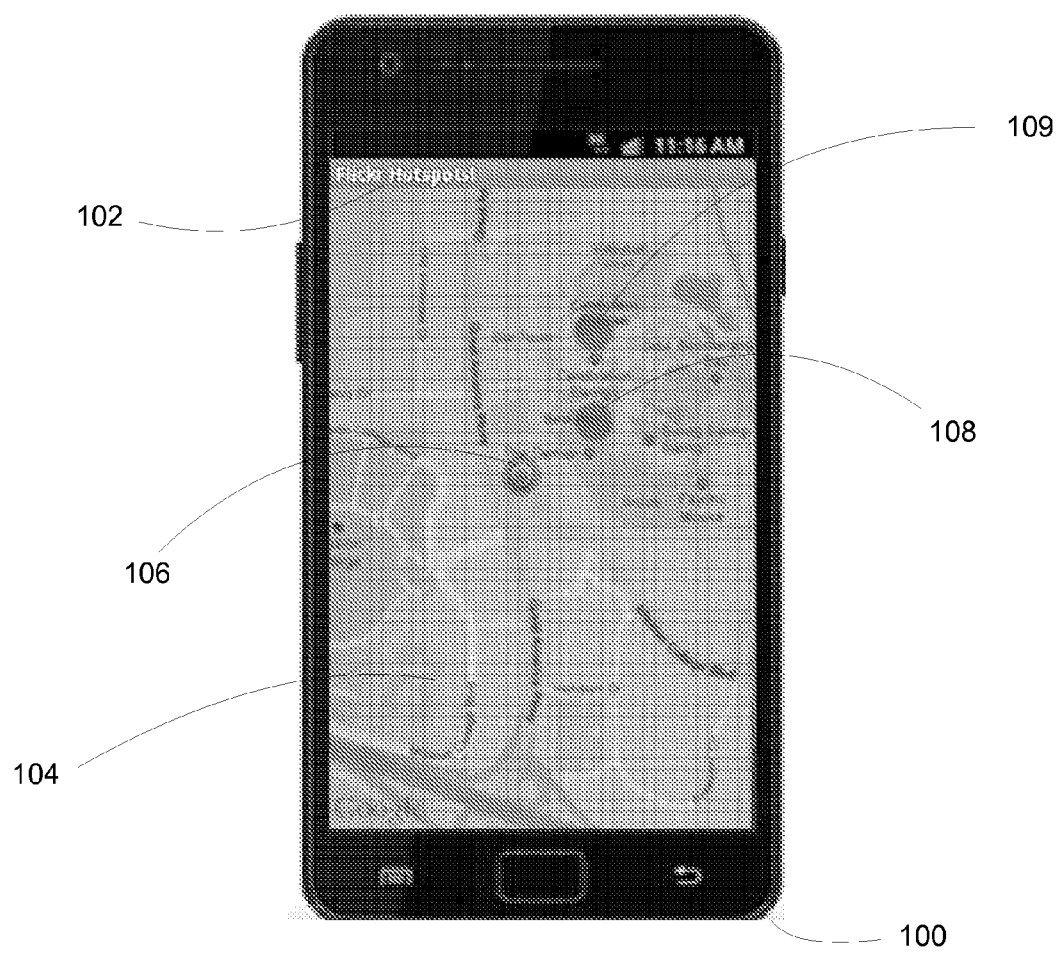
FIG. 1 illustrates a mobile computing device having a photograph hotspot discovery system according to one embodiment of the present invention.

According to the present application, a hotspot discovery system is provided. The hotspot discovery system shows the user the locations of interesting photos on a map based on a current location, or the location of any selected location centered on the map. Locations of the interesting photographs in an area, in particular, densely photo-populated locations, may be referred to as "hotspots." FIG. 1 presents a mobile computing device including a photograph hotspot discovery system according to an embodiment of the present invention.

Device 100 may comprise any mobile computing device such as a cell phone, personal digital assistant (PDA), smart-phone, tablet computer, E-reader, or any other computing device capable of connecting to a network. Although FIG. 1 depicts device 100 as a mobile computing device, device 100 is not limited to such devices and may comprise a personal computer (PC), workstation, terminal, or notebook computer. Device 100 includes a graphical user interface (GUI) or a browser application provided on a display (e.g., monitor screen, LCD, LED display, touch-screen, projector, etc.).

A hotspot application 102 comprises software or instructions for remote execution run on and displayed on device 100. The hotspot application 102 may be developed for and run on several operating systems, such as Apple iOS, Android, Blackberry OS, Microsoft Windows Phone, and any other mobile operating system, or PC operating systems. Hotspot application 102 provides an interactive interface for locating and navigating to photos and photographic hotspots. The application may provide multiple hotspot discovery options and features, such as "Find Local Hotspots," "Find International Hotspots," "Find Random Hotspots," and "Most Popular Hotspots." The user may also specify a hotspot or photograph location radius defining the range to which hotspot discovery is limited, given a user location or a user-specified location.

Region map 104 (or a portion of a map) may be retrieved and displayed by hotspot application 102 in response to user selection of the hotspot discovery options. The user selections and various other commands may be received by clicking, selecting, pressing, tapping icons/buttons on device 100, or via speech recognition techniques known by one of ordinary skill in the art. Upon selecting a hotspot discovery option, region map 104 may be generated and displayed on device 100. The region map 104 may be generated from map information stored on device 100, map files provided with hotspot application 102, or map data retrieved from third party map service providers, such as Yahoo! Maps, Bing Maps, Google Maps, Nokia Maps, MapQuest, etc.

Retrieval of the displayed region map 104 may be determined based on a geographical location associated with the user of hotspot application 102, displayed as user location 106 on region map 104. According to another embodiment, the displayed location of region map 104 may be based on a user-specified location independent from the user's location. A location other than the user's actual location may be provided to the system as a selected location in region map 104 for vacation and travel planning, or virtual exploration (e.g., the "Find International Hotspots" feature).

As an example, the display illustrated in FIG. 1 may be provided in response to a user selection of the "Find Local Hotspots" option. The region map 104 can be navigable by a user, where the user may zoom in and out on the region map 104 using, for example, finger gestures on a touch-screen of device 100, or other user interface interactions. A user may also pan, drag, or navigate region map 104 by other touch-screen finger gestures and user interface interactions. While navigating region map 104, hotspot application 102 may re-create or update the displayed region map 104. Updating region map 104 includes retrieving map data stored on device 100, from a third party map service provider, or from a cache of previous map retrievals.

User location 106 may correspond to a real-time location of the user of device 100. The real-time location may be determined based on mobile phone tracking techniques. A location of the user can be determined by either mobile phone tracking techniques or a location manually specified by the user. Mobile phone tracking techniques can be used to ascertain a current position of a mobile phone/device, stationary or moving. This may be accomplished by techniques known by one of ordinary skill in art such as, multilateration of radio signals between radio towers of a cellular network and the device 100, Internet Protocol (IP) Geolocation, and Global Positioning System (GPS) tracking. In another embodiment, user location 106 may be determined based on a location, coordinates, or address provided by the user.

An exemplary representation of user location 106 is illustrated in FIG. 1. The user location 106 is displayed as a "dot" or circle that represents an approximation of the actual coordinates or address of a current user location. The dot representing user location 106 may be dynamically or periodically updated (e.g., every couple of seconds, or minutes). Hotspot application 102 may also propagate and cause display of photos on region map 104 such as photo 108 and 109 on region map 104. Photos 108 and 109 are displayed as markers or identifiers (e.g., dots) indicating the location of photographs determined to be of interest. Preferably, but not required, user location 106 may be displayed as an identifier that is distinguishable from photos 108 and 109. The markings representing user location 106 and photos 108 and 109 may also be displayed on region map 104 in various shapes, colors, and sizes. The various shapes, colors, and sizes may also be used to distinguish a user's location from the photos.

According to an exemplary embodiment user location 106 may be displayed as a blue dot while photos 108 and 109 may be displayed as red dots.

Photographs associated with a location of a user or region map 104 (e.g., geo-tagged) may be retrieved asynchronously using, for example, Asynchronous JavaScript and XML (AJAX) or other techniques or mechanisms suitable for creating asynchronous data transmission and retrieval as a background activity without interfering with the display and interaction with region map 104. The photographs may be retrieved from online photograph collections or from third party image hosting and sharing services. For example, using the user's location, photographs that have been tagged with a location (geo-tagged) within the vicinity of the user location may be retrieved from the Yahoo! Flickr photo service. Photographs may be ranked and selected based on their interest values for display on region map 104, such as photos 108 and 109.

Photographs with the highest rankings, which may be based on an interestingness metric (or photographs that are the "most interesting"), may be selected and displayed on region map 104. According to one embodiment, interestingness is a function that can be used to determine an interest level of a media object based on user actions related to the media object (e.g., photographs), including the amount of clickthroughs, interactions, comments, views, and time varying behavior of the aforementioned actions. The interestingness metric is described in further detail in commonly owned U.S. Patent Application Publication No. 2006/0242139, entitled "INTERESTINGNESS RANKING OF MEDIA OBJECTS" which is herein incorporated by reference in its entirety.

Photos 108 and 109 may identify locations on region map 104 of where (either exactly or approximately) interesting photographs have been taken or geo-tagged with respect to the user's location. In one embodiment, zooming in on the location, area, or region of photos 108 and 109 may lead to hotspot application 102 to retrieve and cause display of additional photos. A user may select a given one of photo 108 or 109 (e.g., "tapping" a location on a map on a touch-screen of device 100 corresponding to a dot associated with a photo) to view the photograph. In addition to viewing the photograph, the hotspot application 102 may also provide navigation directions to the given photo. For example, if the user location 106 is within a predetermined range deemed as a "walkable" or "drivable" distance from the location of a given photo, navigation directions may be provided to the user.

According to an embodiment, hotspots may be identified using photos identified in hotspot application 102. Hotspots may include a cluster or a set of closely grouped and overlapping photographs. In another embodiment, identifying hotspots is not necessarily limited to identifying clusters of photographs, but may also include identifying clusters of other types of media objects such as video, music, etc. For example, the hotspot discovery application 102 may identify an area on a map including a plurality of "interesting" videos at the South Street Seaport in downtown Manhattan, N.Y., as a hotspot.

Figure 2:
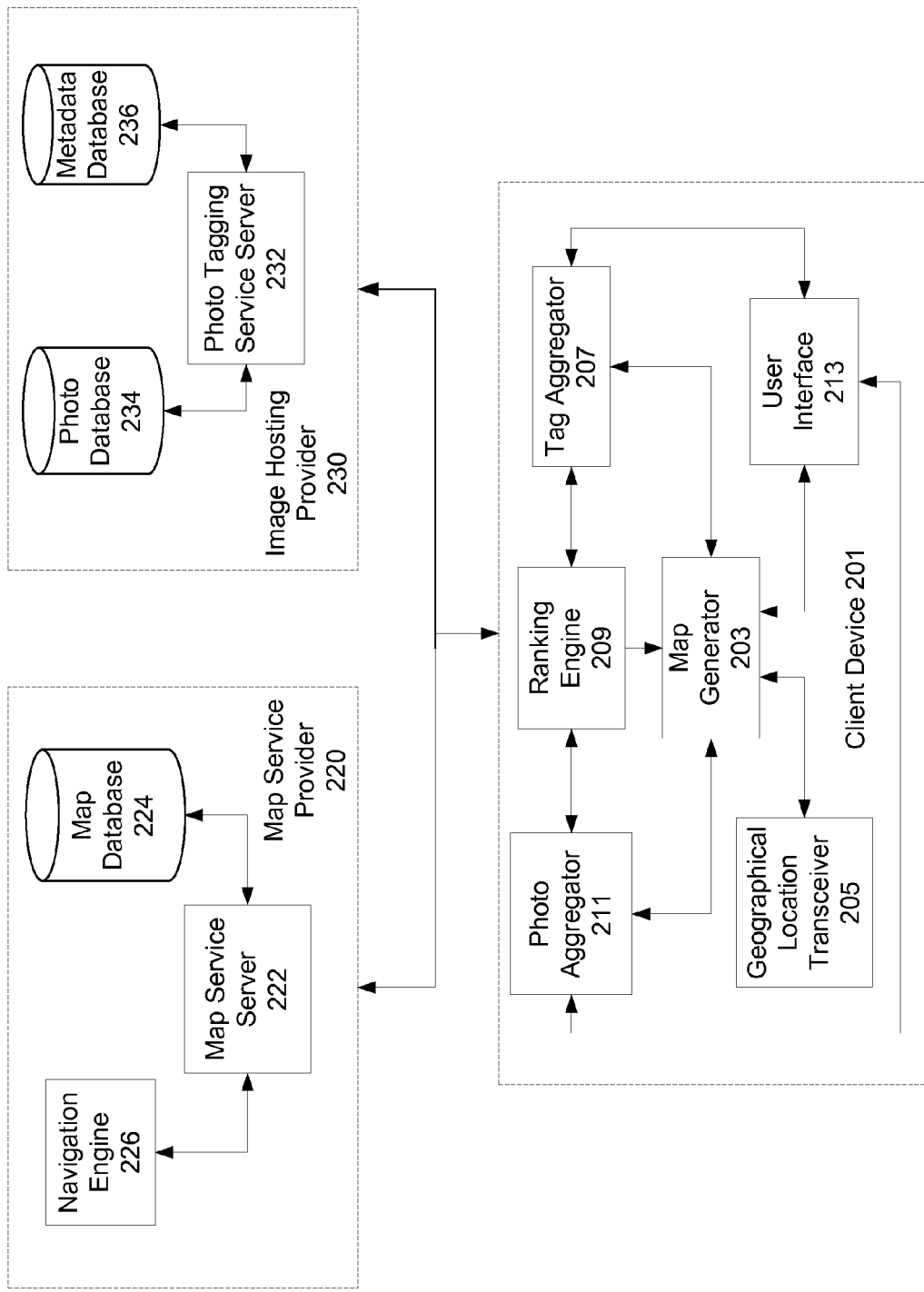
FIG. 2 illustrates block diagram of a system for photograph hotspot discovery according to one embodiment of the present invention.

FIG. 2 illustrates a block diagram of a system for photograph hotspot discovery according to an embodiment of the present invention. An embodiment of the system includes client device 201, map service provider 220, and image hosting provider 230. Client device 201 may communicate with and transmit data between map service provider 220 and image hosting provider 230 through a network. The network may be any suitable type of network allowing transport of data communications across thereof. In one embodiment, the network may be comprised of cellular networks, WiFi, wireless service provider networks, and the Internet, following known protocols for data communication, or any other communication network, e.g., any local area network (LAN), or wide area network (WAN) connection.

Client device 201 comprises map generator 203, geographical location transceiver 205, tag aggregator 207, ranking engine 209, photo aggregator 211, and user interface 213. Through user interface 213, client device 201 may provide for the display of a photograph hotspot discovery application to a user of client device 201, and for the interaction therewith. User interface 213 may provide various options and features offered by the photograph hotspot discovery application, such as the ones described above, from which a user of client device 201 may choose. In response to receiving a selection, user interface 213 may display a map image generated by map generator 203 based on a selected option. Map generator 203 may create or display a map interface based on map data stored on map database 224 from map service provider 220. Requests for map data may be transmitted from client device 201 to map service server 222 where it responds to the request by retrieving map data from map database 224 and transmitting the map data to client device 201.

The location of the user may also be determined by geographical location transceiver 205 for certain options of the photograph hotspot discovery application (e.g., "Find Local Hotspots"). Geographical location transceiver 205 may send and receive communication signals with a satellite or a cellular network to determine the user's location. According to one embodiment, geographical location transceiver 205 may be a GPS device. The geographical location transceiver may periodically translate the communication signals into location data representing the user's current location and provide this information to map generator 203 to render the user's location onto the map image on user interface 213.

Tag aggregator 207 identifies photos with tags associated with a geographical location of the map image displayed on user interface 213. The tag aggregator 207 may identify photos from one or more third party services such as image hosting provider 230. As known, there exist online collections of images, the images of which are generally provided with what is referred to in the field as "tags" or textual identification information. An example of this is the Yahoo! Flickr web service. Flickr is a popular website for users to share, store, and tag personal photographs. The photographs can be made publicly available and searchable, including searching the photographs by the tags. For example, online image collections, such as Flickr, may include large databases of photos about famous landmarks and tourist related spots where each photo has one or more tags associated with these spots.

Photos or videos of streets and neighborhoods with tags may be created by users and/or the service provider. Image hosting services such as Flickr may ask photo submitters to organize images using tags (a form of metadata), which enable searchers to find images related to particular topics, such as place names or subject matter. Tags are generally chosen informally and personally by the creator of an item or by its viewer, depending on the system. Tags may provide valuable information associated with the picture such as the subject, event, time, and location associated with photograph. This kind of metadata helps describe photographs and allows for them to be found by browsing or searching.

Image hosting provider 230 may comprise an online collection of images and provides for photograph storage and sharing services utilized by client device 201 according to one embodiment. The image hosting provider 230 includes a photo database 234 and metadata database 236. Tag aggregator 207 may search for and explore photographs (which may be shared photographs) associated with the location of the map image in metadata database 236. In another embodiment, the user of client device 201 may have an account with the image hosting provider 230 and login with the user account to access photographs, which may comprise publicly shared photographs, as well as privately shared photographs of friends on the image hosting service. In yet another embodiment, the user of client device 201 may have a social networking account and tag aggregator 207 may connect to a social networking website, such as Facebook, Google+, and Pinterest, and retrieve tagged photographs of members in the user's social network.

Metadata database 236 may store data records associated with photographs that have been tagged. Tag aggregator 207 may identify that photographs are associated with a particular geographical location via tags or other fields stored in the photo data records. The photo data records may include fields such as, 'tags', 'author', 'date', 'photo index', etc. The 'tags' field may store user phrases or keywords embedded into a given photograph by the author or creator of the photograph. In one embodiment, the 'tags' field includes the location information of where a photograph was taken or is associated with. In another embodiment, the location of a photograph may be stored in another field, such as a geo-tag field. Examples of tagging photographs with geographic location data or information are described in further detail in U.S. Patent Application Publication No. 2009/0222432, entitled "GEO TAGGING AND AUTOMATIC GENERATION OF METADATA FOR PHOTOS AND VIDEOS," and U.S. Patent Application Publication No. 2008/0204317, entitled "SYSTEM FOR AUTOMATIC GEO-TAGGING OF PHOTOS," each of which is hereby incorporated by reference in its entirety.

The 'author' field may store the name of the creator or user associated with the photograph. A 'date' field may indicate the date of which a photograph was taken or uploaded. The 'photo index' field may store a reference number correlating a photo data record to a photograph or image file stored in photo database 234. The number of the 'photo index' field may be used by photo aggregator 211 to retrieve the photograph associated with a given photo data record. In addition, the photo data records may also include information associated with user actions related to a photograph used to determine interestingness. Photo tagging service server 232 may create and update these data records as well as manage the associations between the records in metadata database 236 and the photographs stored in photo database 234.

In some embodiments, the tag aggregator 207 is operative to send asynchronous requests to photo tagging service server 232 for retrieving location-relevant photo data records. Tag aggregator 207 may include a text-based image retrieval search engine. Location-relevant tagged photographs may be determined based on the 'tag' or the 'geo-tag' fields within the photo data records. Asynchronous requests allows for the display of a map image while photos are discovered in the background and may be dynamically propagated for display on the map image. The photo data records may be transmitted from image hosting provider 230 to client device 201 and stored or cached, e.g., by tag aggregator 207.

The photo data records may be analyzed by ranking engine 209, which is operative to determine the interestingness of the photographs associated with the photo data records and rank them accordingly. In an alternative embodiment, photo data records may include an existing 'interestingness' field with an interestingness metric value determined by image hosting provider 230 or other entity. When an interestingness value of a given photograph has already been determined, the system according to one embodiment may use the provided interestingness value as-is or modify the provided interestingness value. According to another embodiment, where interestingness is not provided by image hosting provider 230, ranking engine 209 or other component may calculate interestingness values for each of the retrieved photographs.

Regardless of the interestingness value used, photographs deemed as the most "interesting" according to the interestingness value are identified. The identification may be communicated to map generator 203 where photo identifiers corresponding to the photographs are generated for display on the map image. The photo indicators may be dynamically propagated for display on the map as each interesting photograph is identified (e.g., in real-time) or in batches. According to another embodiment, map generator 203 may wait for the retrieval of a predetermined number of identified photos before displaying a map image with photos, where additional photos may be subsequently propagated for display on the map image.

A user of client device 201 may select a given photo on the map image displayed by user interface 213. Upon selection of a photo, the photograph associated with the selected location may be displayed along with its tags or metadata. The photograph may be retrieved by photo aggregator 211 from image hosting provider 230. Photo aggregator 211 may generate and transmit a request to photo tagging service server 232 for the retrieval of the photograph corresponding to the selected location using the 'photo index' field in the photo data record associated with the selected photo. Photo tagging service server 232 may look up and retrieve a photograph corresponding to the value of the 'photo index' field from photo database 234 and transmit the photograph to client device 201. In another embodiment, photo aggregator 211 may store or cache the photographs corresponding to the identifiers prior to user selection. The retrieved photo and the information in the photo data record retrieved by tag aggregator 207 may be used by user interface 213 to display the photograph and the details associated with the photograph.

According to one embodiment, displaying a photograph and related details may also include providing one or more navigation options to the location associated with the selected photo. An option for walking or driving navigation guidance may be available to the user of client device 201 based on the distance between the user of client device 201 and a photo. The availability of navigation guidance may also be determined based on any terrain, physical, political, and legal limitations that may prevent walking or driving to the location of the photo. A navigation request may be received by map service server 222 of the map service provider 220 from client device 201. The request may include geographical location information of client device 201, determined by geographical location transceiver 205, and a location extracted from photo data record of the displayed photograph.

In response, navigation engine 226 may calculate one or more routes between the geographical location of the client device 201 and the location associated with the displayed photograph. The one or more calculated routes are transmitted to the client device 201, where they may be used to create a highlighted route on the map image by map generator 203 and to provide navigation directions via user interface 213. In an alternative embodiment, the navigation routes may instead be calculated and provided by the map generator 203 to user interface 213.

According to another embodiment, some or most of the components in client device 201 illustrated in FIG. 2 may instead be located on a remote server (not illustrated) to provide the photograph hotspot discovery system as a cloud-based service. The remote server may perform the processing functions of one or more components comprised in client device 201. Data communications with map service provider 220 and image hosting provider 230 may also be transitioned to the remote server, therefore simplifying and reducing bandwidth usage of client device 201.

Figure 3:
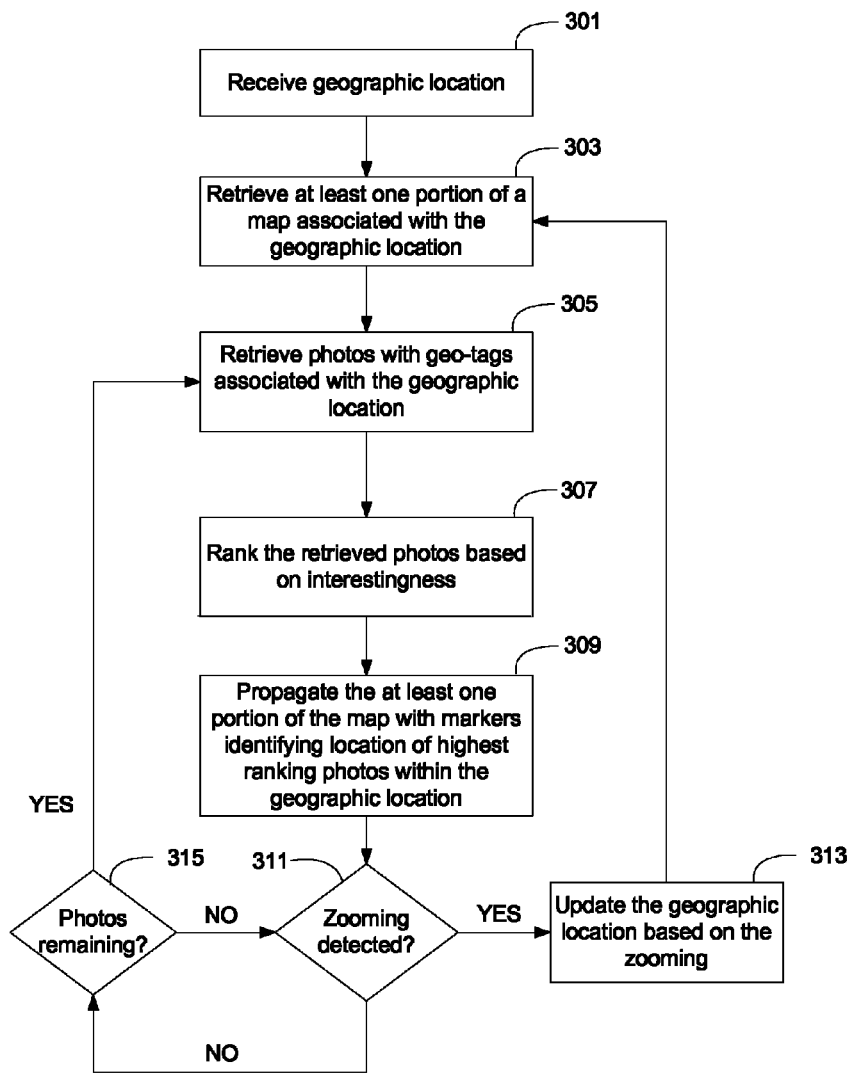
FIG. 3 illustrates a flowchart of a method for discovering photograph hotspots according to one embodiment of the present invention.

FIG. 3 illustrates a flowchart of a method for discovering photograph hotspots according to one embodiment. A user of a computing device may locate photographic hotspots using a photograph hotspot discovery software application. The application may request a geographic location to retrieve a target map area and to locate photographs and hotspots within the area of the geographic location. A geographic location is received, step 301. The geographic location may be received either as a manual input by the user or by a geographical location determining device, such as a GPS module embedded within a device running the hotspot discovery application. Geographic location may include location information such as geographical coordinates, or an address, as well as a search radius. The search radius may define the radius from the geographic location used to determine map data retrieval and a radius to search for photographs.

In a next step 303, at least one portion of a map associated with the geographic location is retrieved. A search radius may be predefined or indicated by the user for determining the portion of the map to display with reference to the received geographical location. The map may be retrieved from a third party map data provider or from preexisting map data stored on the computing device running the hotspot discovery application suitable for use by the application. Retrieving the at least one portion of the map associated with the received geographic location may also include displaying the at least one portion of the map to the user. In some embodiments, the user's location may also be displayed on the map relative to the geographic location (e.g., the user's location is centered on the map display as illustrated in FIG. 1).

Photographs with geo-tags associated with the geographic location are retrieved, step 305, which may be retrieved from online photograph collections that store photographs and where the photographs can be made publicly available. In another embodiment, the photographs may be retrieved from social networking sites where only certain photographs are available to the user of the photograph hotspot discovery application based on the user's social network connections. According to some embodiments, the photographs may be retrieved in the background via asynchronous communications between the photograph hotspot discovery application and the photograph source. Retrieving the photographs may include extracting metadata associated with the photographs and parsing geographical information. The photograph hotspot discovery application may determine using the extracted geographical information of the photographs whether the photographs are associated with the received geographic location.

In one embodiment, geo-tags may be embedded into photographs by the process of geotagging. Geotagging may include geographical identification metadata of media such as photographs, videos, and other types of media. Data in a given geo-tag may include, but is not limited to, latitude and longitude coordinates, altitude, bearing, distance, accuracy data, street address, and place names. Geotagging can help users find a variety of location-specific information, e.g., one can find images taken near a given location by entering latitude and longitude coordinates. Geotagging may also inform users the location of the content of a given picture or other media, and allows for the photograph hotspot discovery application to show media relevant to a given location. Media, such as photographs, may be geotagged by capturing geographical information at the time the photograph is taken or by attaching geographical information after the picture is taken. To capture geographical data at the time the photograph is captured, a camera may interface with a geographical location module, such as in a smartphone that includes GPS capabilities.

The retrieved photographs are ranked based on interestingness, step 307. According to one embodiment, interestingness is a measure of interest of a media object, such as photograph, that can be based on several factors such as click-through, interactions, comments, and views. Ranking the photographs associated with the geographical location may include determining an interestingness score for a given photograph. The interestingness score may be provided by the source of the retrieved photographs. In an alternative embodiment, the interestingness score is calculated by the photograph hotspot discovery application or another server side process. The ranking of the retrieved photographs is in a direct relationship with the interestingness score (e.g., the higher the interestingness score the higher the ranking) The ranking may be based on a ranking relative to each photograph in a pool of retrieved photographs, a ranking based on an average interestingness of the photographs that have been retrieved for the geographical location, or any other ranking algorithms known by one of ordinary skill in the art, or combination thereof.

Step 309 includes propagating the at least one portion of the map with markers identifying the location of highest ranking photos within the geographic location. A subset of photographs with the highest interestingness scores may be identified on the map with photo markers. In embodiments where user location is also displayed on the map as a marker, the photo markers may be distinguished from the user location marker by, for example, color, shape, and/or size. According to another embodiment, propagating the at least one portion of the map with markers identifying the location of highest ranking photos within the geographic location includes identifying and propagating the at least one portion of the map with markers identifying the location of photographs with interestingness scores above a predetermined threshold. The threshold may be an interestingness value that indicates that a given photograph is "interesting enough" for warranting a display on the map. Markers may be displayed as translucent identifiers that are propagated over other photo markers on at least one portion of the map and may appear darker as a result of overlapping with other photo markers. The resulting darker markers (from overlapping and close groupings or clusters of photo markers) may be used to identify hotspot locations. Further discussion of overlapping markers is described with reference to the description of FIG. 4A.

A determination is made whether a zooming action has been detected, step 311. The user of the photograph hotspot discovery application may zoom in and zoom out of a displayed portion of the map. The determination of a zooming action may include monitoring for any change in the display of the map caused by the user. Detecting a zooming action may also include a detected movement of the user's location, panning or scrolling of the displayed map. If a zooming action is detected, the geographic location is updated based on the zooming action, step 313.

When a zooming action occurs, the displayed map portion and search radius associated with the received geographic location may be updated and the method returns to step 303. For example, if the user zooms in from "city level" to "street level," the photographs are retrieved from the online photograph collections at the "street level." The "street level" may create a more refined search of photograph hotspots that causes the display of a greater number of photos for the zoomed in area of the map than previously displayed on the map before the zooming action. Previous photographs obtained at the "city level" may be cached if the user zooms back out. At the "street level," if the user pans over to a location one mile away, the application may automatically start retrieving photographs for the new location. Older photographs may remain cached if the user pans back to the older street location.

When no zooming action is detected, it is determined whether there are any more photographs with geo-tags associated with the geographic location, step 315. If there are still photographs, the method returns to step 305 to retrieve additional photographs. Retrieving photographs may be performed in the background, even when the user is browsing photographs or viewing photographs. If there are no longer additional photographs to be retrieved, the method loops back to step 311 where a polling loop is created for detecting a zooming action. The polling routine, step 311, may be run continuously until termination of the photograph hotspot discovery application. In another embodiment, steps 311 and 313 are not limited to being performed only after step 309, but rather, step 311 can be a software interrupt that may be triggered, for example, anytime between steps 303 through 309. Step 313 may be an interrupt service routine (ISR) that is performed upon triggering of step 311. Upon the occurrence of a zooming action, step 311 may trigger a change in execution of the method flow and perform the ISR of step 313.

A user looking for good locations for photography may use a photograph hotspot discovery application. The application may show the locations of interesting photos and hotspots in a given area. FIG. 4A through FIG. 7 illustrate screenshots of the photograph hotspot discovery application according to one embodiment of the present invention.

Figure 4A:
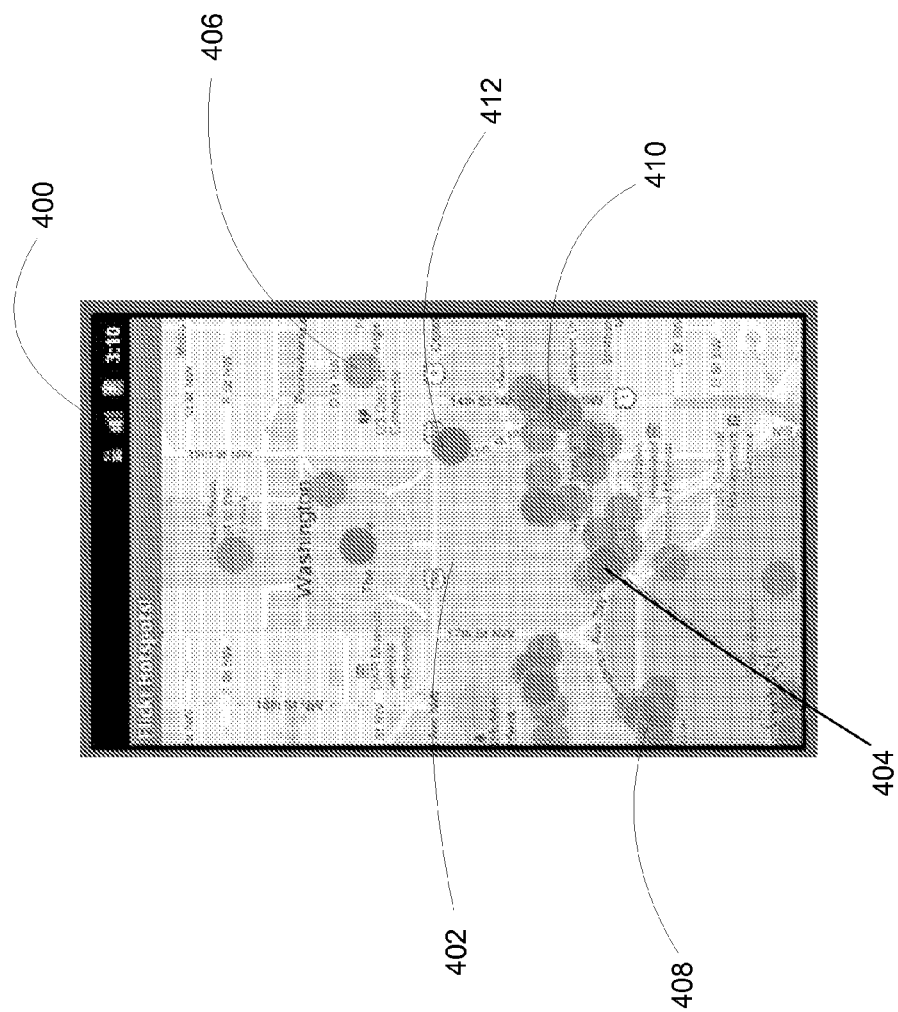
FIG. 4A, FIG. 4B, FIG. 5A, FIG. 5B, FIG. 6, and FIG. 7 illustrate screenshots of a photograph hotspot discovery system according to one embodiment of the present invention.

FIG. 4A presents a display screen 400 that comprises a region map 402 Washington D.C. displayed by a photograph hotspot discovery application. Region map 402 includes a plurality of red translucent dots or markers representing the locations of the most "interesting" photographs such as marker 404 and marker 406. Marker 404 identifies the location of a photograph on the map that was determined to be "interesting." Additionally, marker 404 may also illustrate a hotspot of translucent overlapping photo markers appearing darker in color. According to the illustrated embodiment, hotspots may be indicated using translucent red dots. In the illustrated embodiment, clusters of photographs such as 404, 408, and 410 represent exemplary hotspots. While a single dot may not necessarily indicate a hotspot, multiple translucent red dots in close proximity to one another and/or overlapping may be rendered in a darker shade or color of red based on the amount of overlapping photos, which may be used to indicate a hotspot. The markers labeled 404 and 412 show such hotspots including a plurality of overlapping photos in a common location. In one embodiment, selecting label 404 or 412 may provide a user with a list of photographs corresponding to the overlapping photographs corresponding to labels In another embodiment, the photograph hotspot discovery application may highlight the clustered and/or overlapping photos to indicate hotspots. As illustrated in FIG. 4A, marker 404 is displayed in a darker color or shade compared to that of marker 406 due to other photos of which marker 404 overlaps. More interesting areas may include overlapping dots with deeper shades of a given color indicating "high hotness" of high photo density, or hotspots. According to one embodiment, a darker shading of a photo marker and clustering of other surround photos may indicate that a photo associated with marker 404 has a higher interestingness or a higher interest level in relation to a photo associated with marker 406. For example, different shades of colors for photo identifiers can help a user determine, for example, that the location of marker 404 near the Washington Monument is more interesting than the location of marker 406 near The United States Department of Commerce, and the region around marker 404 may therefore be identified as a hotspot.

Figure 4B:
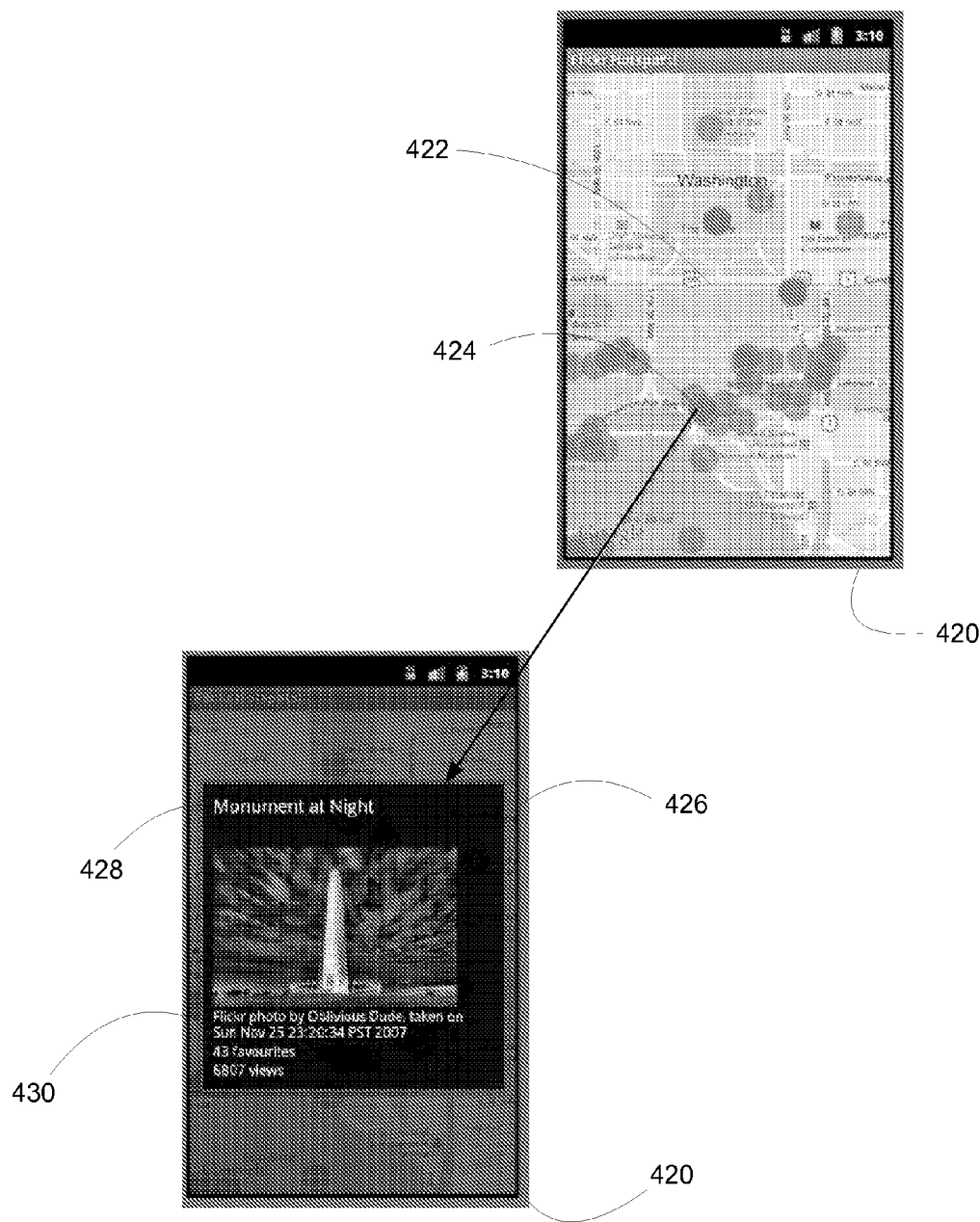

In FIG. 4B, display screen 420 presents a region map 422 with photo 424. A user may tap, select, or click a given photo marker 424 on display screen 420. Tapping on marker 424, which happens to be displayed near the Washington Monument, may reveal a photograph shown in photographic view 426. Alternatively, a user may be presented with a list of photographs to select from when marker 404 corresponds to overlapping photographs. Photographic view 426 includes photo title 428 ("Monument at Night") and photo information 430. Photo title 428 may be a short caption or description produced by a person who submitted the photograph. Photo information 430 may include the author, the date in which the photograph was taken, the number of users marking the photograph as a "favorite," the number of views, etc.

Figure 5A:
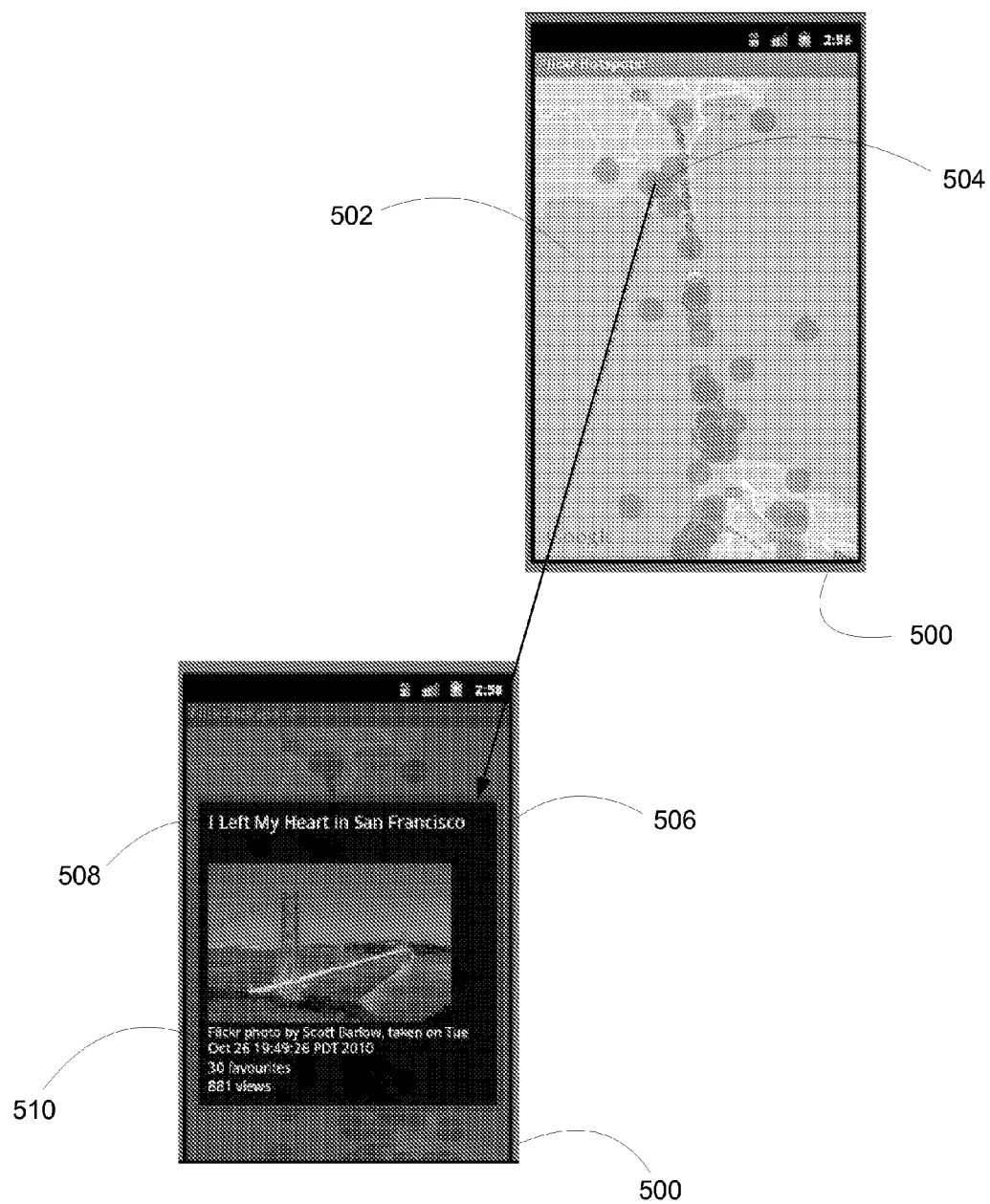

FIG. 5A presents another snapshot of the hotspot discovery application. According to the illustrated example, a user may plan to take pictures of the Golden Gate Bridge in San Francisco using the application. Display screen 500 presents region map 502 with a plurality of photo identifiers. A given photo identifier represents photographs uploaded by users, e.g., to an online photograph collection. Centering the bridge on the map shows the location of the most interesting photos around this area. Selecting photo marker 504 on the northern end of the bridge provides a photographic view 506 showing a picture of the Golden Gate Bridge with photo title 508 of "I Left My Heart in San Francisco," and photo information 510. According to one embodiment, if the user is close enough, the photograph hotspot discovery application provides navigation instructions to the user to the exact or approximate location of the photo or a hotspot created around photo marker 504.

Figure 5B:
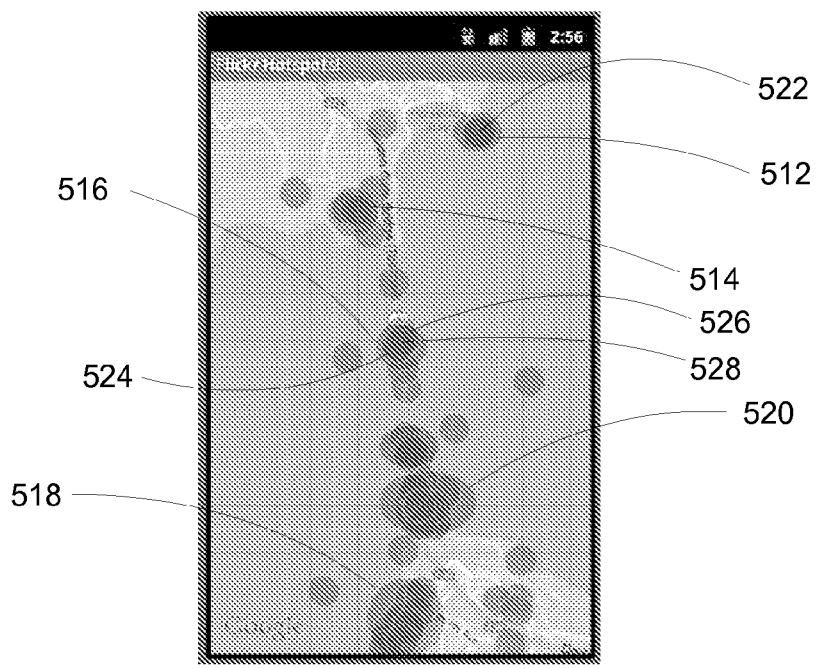

FIG. 5B presents another illustration of the hotspot discovery application. In the present embodiment, hotspots 512, 514, 516, 518, and 520 comprise clusters of overlapping photographs. Each hotspot may identify a specific area of a high concentration of interesting photographs. Although hotspot 512 may appear as a single marker 522, marker 522 includes a number of overlapping translucent photograph markers. The presence of multiple, overlapping photograph markers results in the presentation of a hotspot that may appear darker according to the number of overlapping photograph markers. Similarly, hotspot 516 includes a cluster of overlapping markers 524, 526, and 528 of interesting photographs. According to one embodiment, larger hotspots, such as, hotspot 518 and 520 may indicate locations of higher interestingness than smaller hotspots, such as, 512, 514, and 516.

Figure 6:
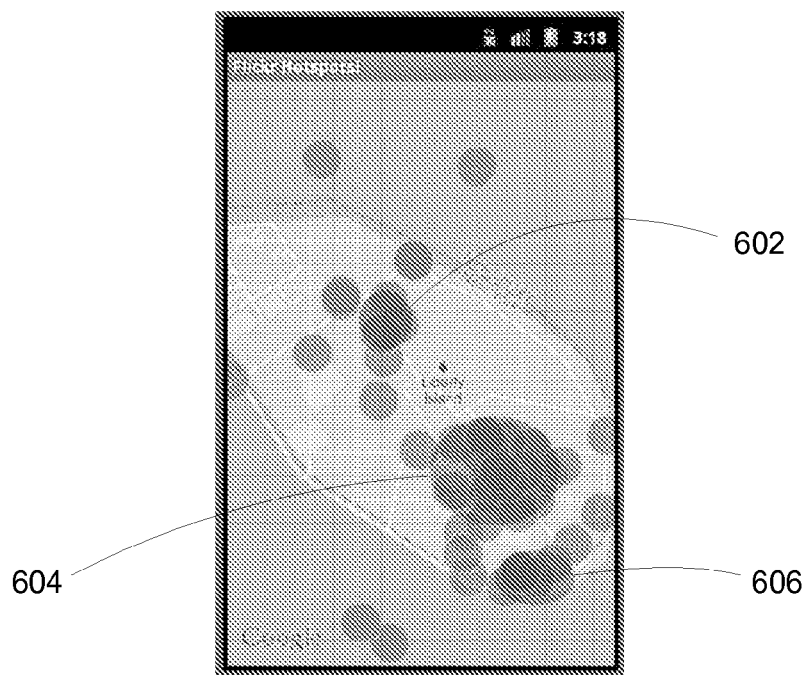

FIG. 6 presents another snapshot of the hotspot discovery application. Hotspots 602, 604, and 606 include a number of photographs concentrated around specific locations of Liberty Island. Identification of such hotspots may be informative for users looking for areas of interest. Larger hotspots, which may comprise areas of higher concentration of interesting photographs, such as hotspot 604, may indicate areas of interest. In the illustrated embodiment, hotspot 604 coincides with the location of the Statue of Liberty on Liberty Island and garners more interest and interesting photographs than hotspots 602 and 606.

Figure 7:
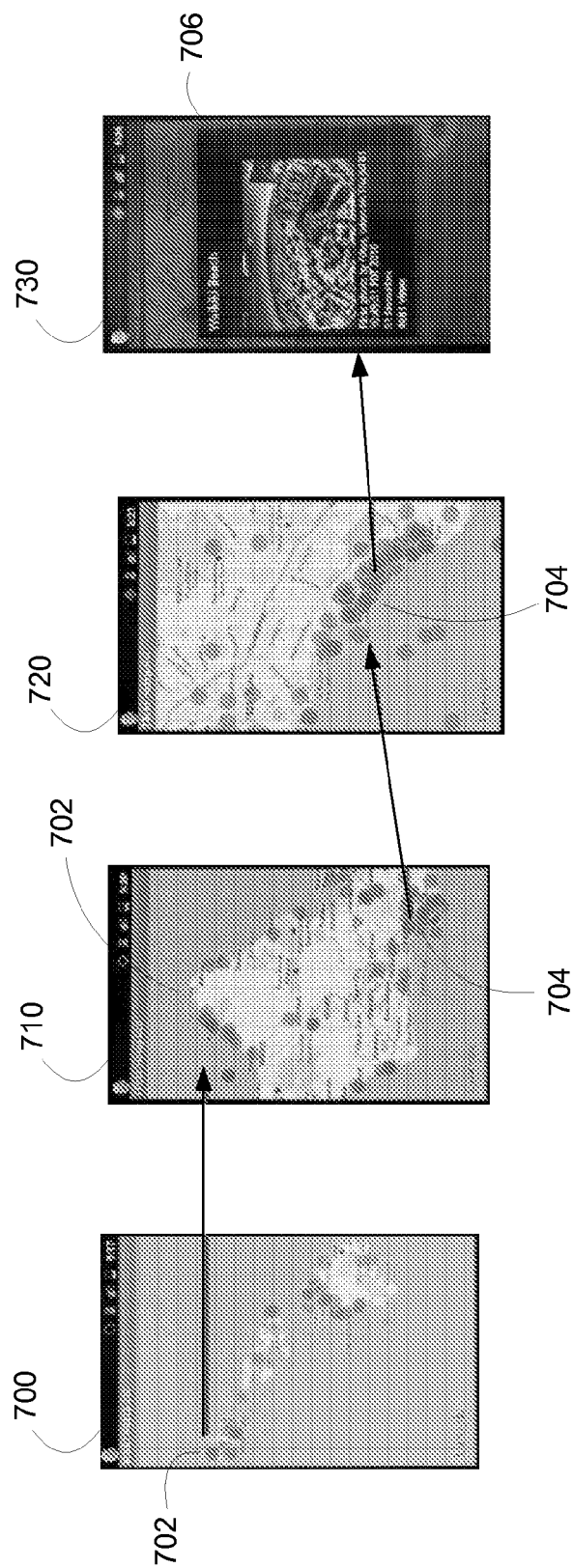

FIG. 7 presents a sequence of screen diagrams of a photograph hotspot discovery application according to one embodiment. In this example, a user may want to find the most interesting photography locations in Hawaii, which the application may display. On display screen 700, a user may choose to zoom in on location 702, for example, the island of Oahu, which transitions to display screen 710. When zooming into Oahu, 710 shows a zoomed in view of location 702 where additional photos are propagated for display in conjunction with the region 702.

Continuing with the present example, it may be determined that there is a large concentration or a hotspot of interesting photos is on the south-eastern tip of the island around Honolulu. Accordingly, a user may want to zoom in even further at location 704, which may be identified as a hotspot location. Zooming in on region 704 may transition to display screen 720, which displays an enlarged view of location 704. As the zoom level increases for a specific location on a map, so do the number of photos that appear due to a finer granularity of photo searching and an enlarged display area to fit a cluster of photos in a given area of the map. When zoomed into Honolulu, the user may see that there are a number of interesting photos on Waikiki beach. Upon a desirable zoom or display of the location, the user may select a given photo in location 704 to provide a photograph view 730 of a picture of Waikiki beach. Upon selection, the photo is revealed and the application displays additional details 706 associated with the photograph. If available, the application may also provide information to allow the user to navigate to the location of the viewed photograph.

Figure 8:
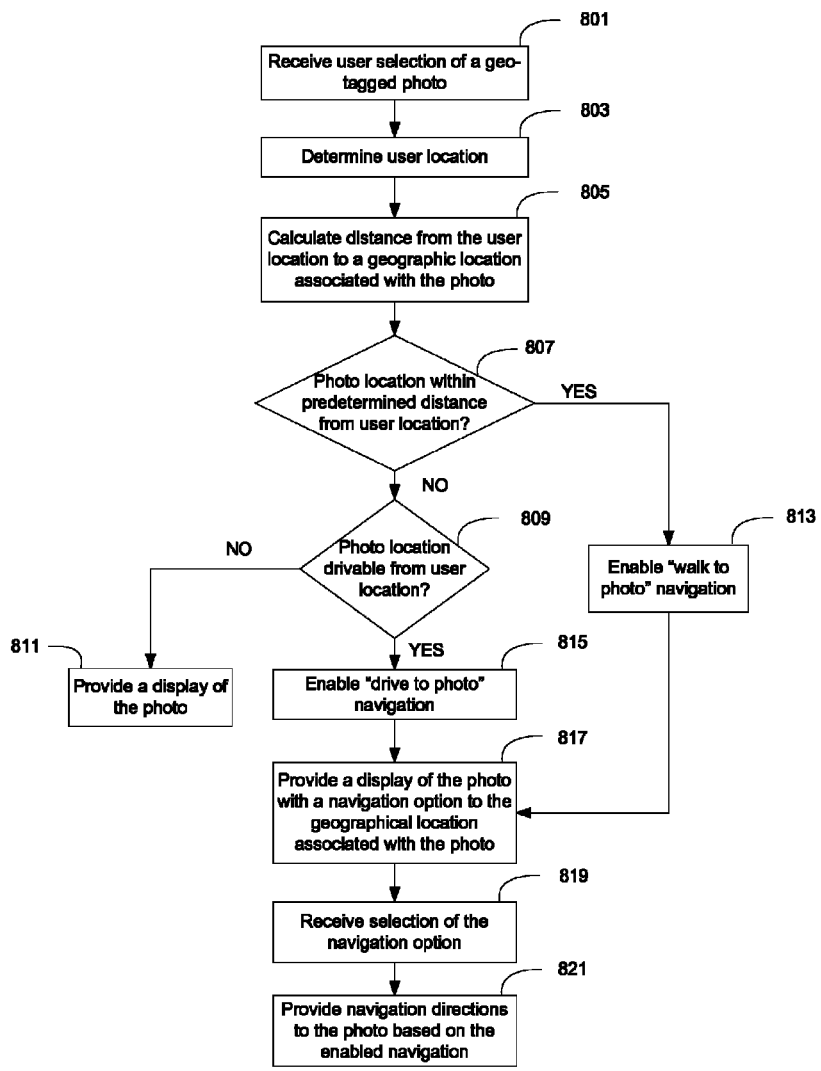
FIG. 8 illustrates a flowchart of a method for navigating a user towards a photograph hotspot according to one embodiment of the present invention.

FIG. 8 presents a flowchart illustrating a method for navigating a user towards a photograph according to one embodiment. User selection of a geo-tagged photograph is received, step 801. When a user selects and views a photo using the photograph hotspot discovery system, the user may want to visit the location associated with the photograph. The photograph hotspot discovery system may include a feature to assist users in navigating to the locations of the interesting photographs. In a next step 803, the user's location is determined. The current location of the user is used to calculate a distance from the user location to a geographical location associated with the selected photograph, step 805.

Using the distance, a determination is made of whether the location of the photograph is less than a predetermined distance from the user location, step 807. The predetermined distance is a distance determined as within "walking distance," however, this walking distance can be configurable and may be modified by the user or by the system when considering other factors such as environmental, terrain, and legal restrictions. If the user clicks on a photograph and the photograph is within a predetermined distance from the user, it is determined that the user is within walking distance from the location of the photograph, and a "walk to photo" navigation is enabled, step 813. A display of the photograph with a navigation option to the geographical location associated with the photograph is provided, step 817. As a result of the enabled walking navigation, the displayed photograph may show a "walk to photo" control. In a next step, step 819, a selection of the navigation is received. Navigation directions to the location of the photograph based on the enabled navigation are provided, step 821. Upon clicking the "walk to photo" button, the map may zoom into an area covering the user and the photograph, showing walking directions to the location of the photograph.

Continuing with the embodiment that FIG. 8 illustrates, if the user is not within a walkable distance from the location of the selected photograph, it is determined whether the location of the photograph is drivable from the user's location, step 809. The drivability to the location of the photograph may be determined based on another predetermined distance that is greater than or equal to the walkable distance. If neither of steps 807 nor 809 are satisfied, a display of the photograph is provided without walking and driving navigation in such a case.

A determination of satisfaction of step 809 (e.g., the photograph location is drivable from the user's location) enables "drive to photo" navigation, step 815. A display of the photograph with a navigation option to the geographical location associated with the photograph is provided, step 817. When viewing photographs, if the user clicks on a photograph to view it, and if the distance between user's location and photograph is drivable but not walkable, the photograph may have a "drive to photo" control. A selection of the navigation option is received in step 819 and in a next step, step 821, navigation directions to the location of the photograph are provided based on the enabled navigation. Upon clicking the "drive to photo" control, driving directions are provided to the location where the photograph was taken. In an alternative embodiment, if the location of the photograph is both within the walking distance and drivable, both "walk to photo" and "drive too photo" navigation options may be enabled.

Figure 9:
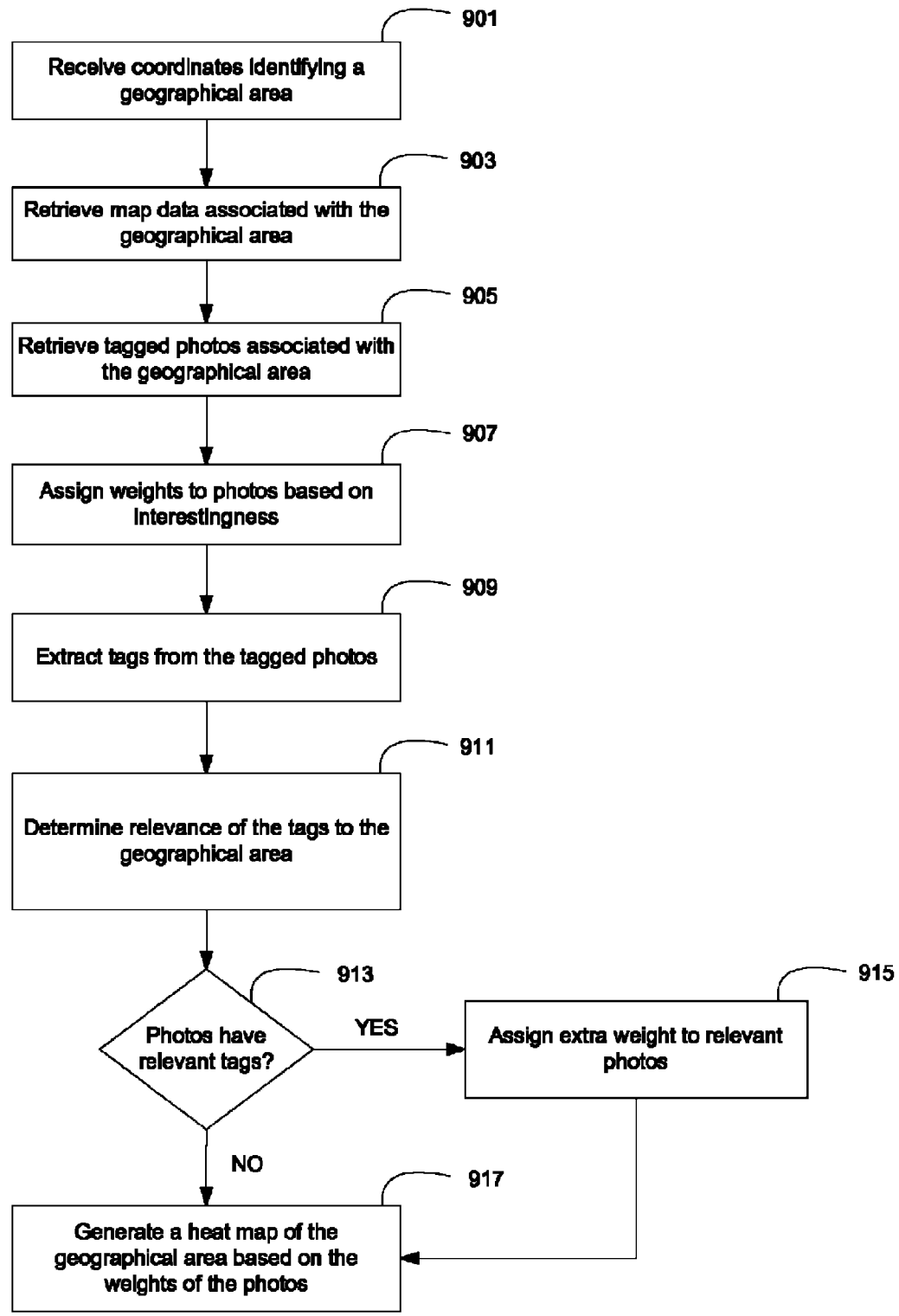
FIG. 9 illustrates a flowchart of a method for generating heat maps based on photograph hotspots according to one embodiment of the present invention.

FIG. 9 presents a flowchart illustrating a method for generating heat maps based on photograph hotspots according to one embodiment. In addition to hotspots, a user may also view a heat map that visualizes the interest level of photographs within a geographic location. A heat map is a graphical representation of data where variable values are represented as colors. A more detailed heat-map may be provided based on an entire set of geo-tagged photographs from one or more online photograph collections to give a more accurate picture of the popularity of an area from a photographic point of view. The photograph hotspot discovery system may collect data for one or more geo-tagged photographs for a particular geographical area and construct a heat map. Construction of the heat map, or updates thereto, may be performed asynchronously and may include a visual display of "hot," "warm" and "cold zones" on various regions of the map.

Coordinates identifying a geographical area are received, step 901. Exact coordinates/addresses or a general location may be received to indicate the geographical area. The coordinates can be provided via manual input by a user or an administrator, or be provided by a geographical location determining device, such as a GPS. Map data associated with the geographical area is retrieved, step 903. The map data may be used as a template for the heat map.

Tagged photos associated with the geographical area are retrieved, step 905. The photographs may be retrieved from online photograph collections or social networks that store photographs that are made available to the photograph hotspot discovery system. Photographs retrieved may be interesting photographs (photos with higher interestingness) and relevant photos (photos with relevant tags). In a next step, step 907, weights are assigned to the photographs based on their interestingness and wherein photographs with higher interestingness values may be assigned greater or extra weight than photographs of lesser interestingness values. The weights of the photographs may be used to determine the details of the heat map corresponding to an interestingness statistic associated with at least a portion of the geographical area.

The tags of the tagged photos are extracted, step 909. Relevancy of the tags to the geographical area is determined, step 911. Determining the relevancy of the tags may include ordering the tags of the retrieved photos according to the number of occurrences of a given tag among the tagged photos. The top percentage of frequently occurring tags may be chosen. The top percentage of tags may be further filtered by removing "irrelevant" tags. Irrelevant tags may be tags that might have meaning to the user who took the photographs but are not necessarily relevant to the particular geographical area. For example, tags like "US", "California" for the location "San Diego Zoo" may be considered irrelevant tags, and do not add any value for a person searching for photos within this area.

According to one embodiment, relevancy of tags is distinguished from interestingness in that relevancy compares the similarity of tags of a photograph with other photographs in the geographical area. The relevancy may be used to determine that a photograph is relevant to the geographical area. For example, photographs around the San Diego Zoo are expected to have the tags "zoo," "animals," "zebra," "lion," etc. The search may gather all or a subset of at least a portion of the geographical area and analyze the relevance of the tags with respect to the geographical area or the relevance among the tags within the at least one portion of the geographical area. The relevancy of the tags may also help identify particular zones in the geographical area where tags of a common theme indicate a relevance cluster.

It is determined whether the photographs have relevant tags, step 913. A set of photographs with relevant tags may be identified as relevant photographs pertaining to at least a portion of the geographical area. Relevant photographs are assigned extra weight, step 915, before generating a heat map of the geographical area based on the weights of the photographs in step 917. The amount of extra weight assigned to the relevant photographs may be based on the degree of relevancy of the tags. Photographs that lack relevant tags or relevancy are not assigned the extra weight before generating the heat map of the geographical area.

Heat maps may be generated based on standard heat map generation algorithms and visually overlaid over a map. The generated heat maps may be used to provide maps similar to maps with photo markers, but instead of photo markers, the map is overlaid with coloring and/or shading indicating zones of varying interestingness or popularity for a particular geographical area (e.g., hotspots). Continuing with the above-described embodiment, locations of photographs that are more heavily weighed (i.e., more popular) may be designated as "hot zones." Conversely, locations of photograph clusters that contain lesser weights may be designated as "cold zones." "Zones" that fall in between the weighting of "hot zones" and "cold zones" may be designated as, for example, "warm zones," "lukewarm zones," "cool zones," etc.

Each distinct zone may also be assigned different colors and/or shading indicating the weight of the photographs on the heat map. The "hotness" of the zones on a heat map may also depend on the center of the map and zoom level according to the set of photos that are confined within the current boundaries of the screen. For example, a particular street within a city may appear "hot" when zoom level is at the "city level" but may not be as "hot" when the zoom level is higher at a "county" or "district" level because the set of photos within the boundaries of the screen may become much larger. In other words, heat map results may vary based on a zoom level. In some embodiments, heat maps may be pre-generated and cached on the server side for faster performance.

Figure 10:
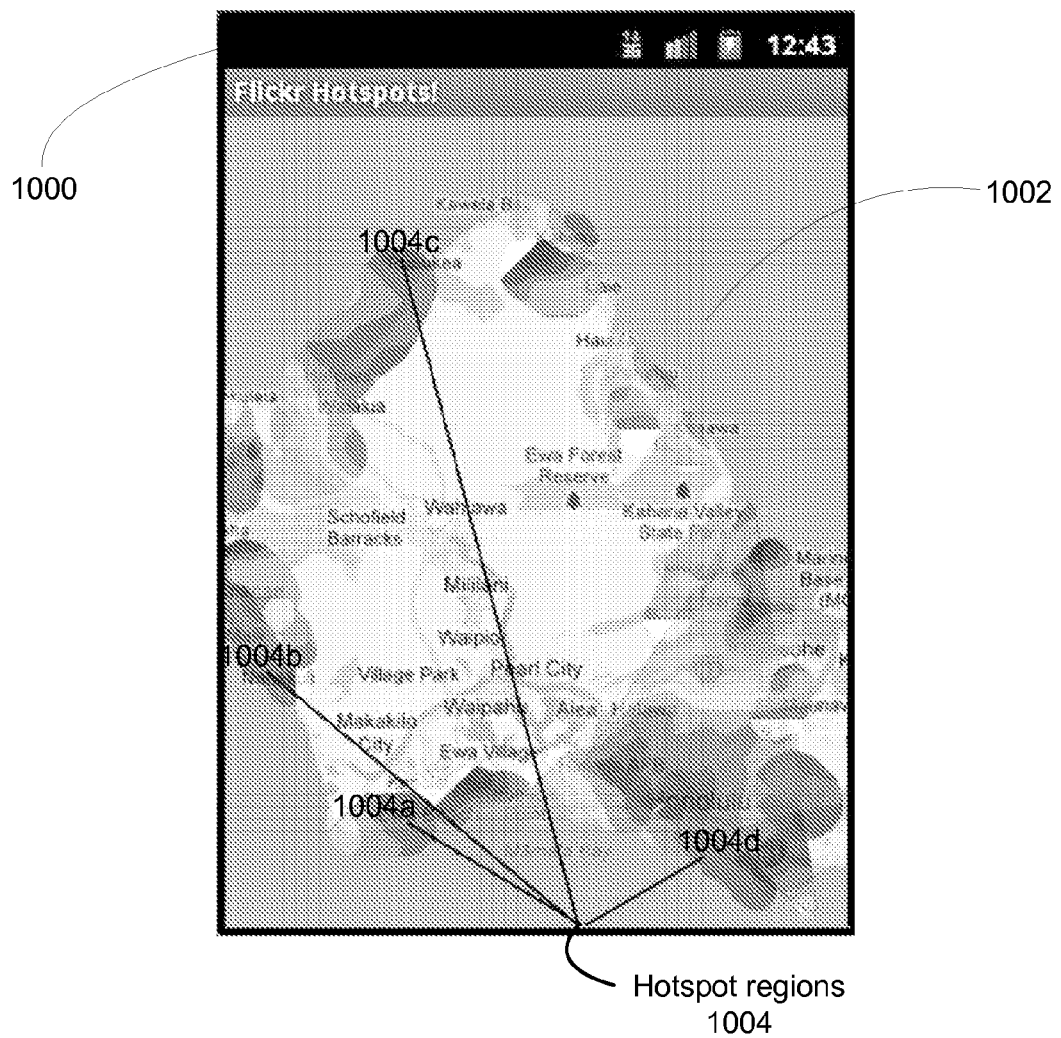
FIG. 10 illustrates an exemplary heat map according to one embodiment of the present invention.

FIG. 10 illustrates an exemplary heat map according to one embodiment. Display screen 1000 displays a region map 1002. Certain portions of region map 1002 are colored to indicate a cluster of photographs and their degree of interestingness or popularity. Hotspot regions 1004 include 1004*a*, 1004*b*, 1004*c*, and 1004*d*. The hotspot regions 1004 represent some of the "hot zones" on the map. These "hot zones" may indicate a higher concentration of the most "interesting" pictures, which would potentially be more attractive areas for photography or sightseeing as compared to the zones of lighter or "cooler" color/shading.

FIGS. 1 through 10 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. A method for discovering locations of photographs, the method including:
   receiving, by a processor, a geographic location;
   retrieving, by the processor, at least one portion of a map associated with the geographic location;
   displaying, by the processor, the at least one portion of the map associated with the geographic location;
   asynchronously retrieving, by the processor, one or more photographs tagged with the geographic location;
   ranking, by the processor, the retrieved photographs based on interestingness of the retrieved photographs, the interestingness of each of the photographs being determined using an interestingness metric based on user actions related the photograph;
   dynamically propagating, by the processor, the at least one portion of the map with translucent, colored markers identifying locations of highest ranking photographs within the geographic location;
   indicating, by the processor, one or more photographic hotspots on the at least one portion of the map based on the propagated markers, at least one of the photographic hotspots comprises a plurality of translucent, colored markers in close proximity to one another and a shade of the color associated with the at least one photographic hotspot is based on the proximity the plurality of translucent markers;
   receiving, by the processor, a zoom action for the displayed at least one portion of the map;
   updating, by the processor, the geographic location based on the zoom action;
   retrieving, by the processor, additional photographs tagged with the updated geographic location; and
   displaying, by the processor, the additional photographs at respective hotspots on the updated geographic location.

2. The method of claim 1 wherein asynchronously retrieving, by the processor, the photographs tagged with the geographic location includes retrieving the photographs from one or more online photograph collections.

3. The method of claim 1 wherein asynchronously retrieving, by the processor, the photographs tagged with the geographic location includes retrieving the photographs from one or more social networking websites.

4. The method of claim 1 further comprising:
   determining, by the processor, a user's location; and
   providing, by the processor, navigation directions to a location of a given photograph.

5. The method of claim 4 further comprising:
   determining, by the processor, a distance between the user's location and the location of the given photograph; and
   determining, by the processor, whether the location of the given photograph is at least one of walkable and drivable distances.

6. The method of claim 1 further comprising:
   generating, by the processor, a heat map based on the interestingness and relevance of the retrieved photographs.

7. Non-transitory computer readable media comprising program code that when executed by a programmable processor causes execution of a method for discovering locations of interesting photographs, the computer readable media comprising:
   computer program code for receiving a geographic location;
   computer program code for retrieving at least one portion of a map associated with the geographic location;
   computer program code for displaying the at least one portion of the map associated with the geographic location;
   computer program code for asynchronously retrieving photographs tagged with the geographic location;
   computer program code for ranking the retrieved photographs based on interestingness of the retrieved photographs, the interestingness of each of the photographs determined using an interestingness metric based on user actions related to the photograph;
   computer program code for dynamically propagating the at least one portion of the map with translucent, colored markers identifying locations of highest ranking photographs within the geographic location;
   computer program code for indicating one or more photographic hotspots on the at least one portion of the map based on the propagated markers, at least one of the photographic hotspots comprises a plurality of translucent, colored markers in close proximity to one another and a shade of the color associated with the at least one photographic hotspot is based on the proximity the plurality of translucent markers;
   computer program code for receiving a zoom action for the displayed at least one portion of the map;
   computer program code for updating the geographic location based on the zoom action;
   computer program code for retrieving additional photographs tagged with the updated geographic location; and
   computer program code for displaying the additional photographs at respective hotspots on the updated geographic location.

8. The computer readable medium of claim 7 wherein the computer program code for asynchronously retrieving photographs tagged with the geographic location includes computer program code for retrieving the photographs from one or more online photograph collections.

9. The computer readable medium of claim 7 wherein the computer program code for asynchronously retrieving photographs tagged with the geographic location includes computer program code for retrieving the photographs from one or more social networking websites.

10. The computer readable medium of claim 7 further comprising: computer program code for determining a user's location; and computer program code for providing navigation directions to a location of a given photograph.

11. The computer readable medium of claim 10 further comprising: computer program code for determining a distance between the user's location and the location of the given photograph; and computer program code for determining whether the location of the given photograph is at least one of walkable and drivable distances.

12. The computer readable medium of claim 7 further comprising computer program code for generating a heat map based on at least one of: the interestingness of the retrieved photographs, and relevance of the tags to the geographical area.

13. A method for discovering locations of interesting photographs, the method including:
receiving, by a processor, coordinates identifying a geographical area;
retrieving, by the processor, map data associated with the geographical area;
retrieving, by the processor, tagged photographs associated with the geographical area;
assigning, by the processor, weights to the photographs based on interestingness, the interestingness of each of the photographs being determined using an interestingness metric based on user actions related to the photograph;
identifying, by the processor from the retrieved photographs, photographs having tags relevant to the geographic location;
assigning, by the processor, extra weight to the photographs identified as having tags relevant to the geographic location;
generating, by the processor, a heat map of the geographical area based on the weights of the photographs, the heat map comprising a plurality of zones, each of the zones being associated with at least a subset of the photographs and displayed with a particular coloring indicative of a hotness of the zone, the hotness of the zone being determined based on a center and zoom level of the heat map, interestingness and relevance of the subset of photographs associated with the zone;
indicating, by the processor, one or more photographic hotspots on the heat map;
receiving, by the processor, a zoom action for the displayed at least one portion of the map;
updating, by the processor, the geographic location based on the zoom action;
retrieving, by the processor, additional photographs tagged with the updated geographic location; and
displaying, by the processor, the additional photographs on the updated geographic location.

14. The method of claim 13 further comprising:
determining, by the processor, relevance of the tags to the geographical area;
identifying, by the processor, a set of relevant photographs from the photographs; and
assigning, by the processor, extra weight to the set of relevant photographs.

15. The method of claim 13 wherein the one or more photographic hotspots indicated on the heat map are based on tagged photographs within the boundaries of the geographical area and zoom level.

16. The method of claim 15 wherein each of the one or more photographic hotspots is designated as a particular zone based on an overall popularity of the photographs clustered in the zone.

* * * * *